United States Patent Office 3,541,214
Patented Nov. 17, 1970

---

3,541,214
2-ALLYL-2-($\beta$-HYDROXYPROPYL) MALONIC ACID UREIDE IN THE TREATING OF DISORDERS DUE TO INSUFFICIENT OXYGEN AND GLUCOSE UTILIZATION IN THE BRAIN CELLS

Jean Heusser, Langnau am Albis, and Christian Schmid, Adliswil, Switzerland, assignors to Messrs. Hommel Aktiengesellschaft, Zurich, Switzerland
No Drawing. Continuation-in-part of application Ser. No. 567,830, July 26, 1966. This application Dec. 17, 1968, Ser. No. 784,474
Claims priority, application Switzerland, July 26, 1965, 10,440/65
Int. Cl. A61k 27/00
U.S. Cl. 424—279           3 Claims

---

ABSTRACT OF THE DISCLOSURE

Method of treating disorders due to insufficient oxygen and glucose-utilization in the brain cells which comprises administering to a subject suffering such disorders an effective amount of the lactone 2-allyl-2-($\beta$-hydroxypropyl)malonic acid ureide.

---

The present application is a continuation-in-part application of our copending United States application, Ser. No. 567,830, filed July 26, 1966, now abandoned.

The present invention relates to a new and therapeutically useful lactone, to the preparation thereof, and to the use thereof in the treatment of disorders due to a reduced oxygen-and glucose-utilization in the brain cells.

Therapeutically useful compounds containing the allophanyl group

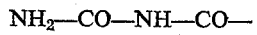

are known; inter alia they are characterized by hypnotic, sedative and the like properties.

The present invention embodies a novel lactone, namely, the lactone of 2-allyl-2-($\beta$-hydroxypropyl)malonic acid ureide ($\alpha$-allophanyl-$\alpha$-allyl-$\gamma$-valerolactone) of the formula

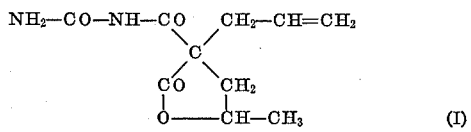

(I)

which is a white crystalline powder melting at 139–141° C., and is characterized by properties which are surprising and unexpected for this type of compound.

The particular properties of the said compound I are detailed in the following:

ACUTE TOXICITY

White mouse:
    $DL_{50}$ p.o.—5.0 grams/kilogram
    $DL_{50}$ i.p.—1.4 to 1.6 grams/kilogram
p.o.=per os, i.p.=intraperitoneal.

SUBCHRONIC TOXICITY

This was tested on guinea pigs, employing a daily dose of the aforesaid compound I of 100 milligrams per kilogram for a period of 28 days. There was no observable difference vis-a-vis untreated controls with respect to weight increase or in the various blood tests. On the 29th day, the test animals were sacrificed, the important organs weighed and, after sectioning, all organs were macroscopically examined. There was no observable differences, either in the said examination or in the weight of the organs, between treated and untreated animals.

PHARMACOLOGY

The pharmacological investigation of the aforesaid novel lactone I of the present invention disclosed a wholly surprising action mechanism, since the said compound lacks properties which are characteristic of the allophanyl group-containing compounds and possesses properties not characteristically possessed by the latter. Thus, the new compound I has no hypnotic properties. Such anticonvulsive action as is present, is markedly weaker than in other known compounds of this type. Novel with, and characteristic of, the new compound I is a pronounced action on the brain cells (cerebral cells). Tests on the rat show that it normalizes the rat-EEG in oxygen deficiency and that it enhances glucose utilization in the brain cells and heart muscle cells. These tests were carried out with radioactively-labeled glucose. The identical properties are shown by the new compound I in vitro in the Warburg apparatus.

Significant test data are as follows:

ELECTROCONVULSION

The anticonvulsive action of the new compound was tested by electroconvulsion in the mouse. The irritation causing electroconvulsion (irritation period 0.2 second, impulse extent 1 msec., frequency 60 Hz., irritant strength 50 ma.) was applied to the mice via corneal electrodes. The lactone of 2-allyl-2-($\beta$-hydroxypropyl)malonic acid ureide I was injected intraperitoneally as 0.5% solution 30 minutes prior to the application of the irritant. The time interval of 30 minutes had been determined by preliminary tests to be suitable for testing the anticonvulsive action of the compound.

The test results are shown in the following table:

| Dose | Number of tests | V[1] | H[2] | +[3] |
|---|---|---|---|---|
| Controls | 20 | 19 | 18 | 7 |
| 100 mg./kg. | 20 | 11 | 9 | 3 |
| 150 mg./kg. | 20 | 10 | 2 | 0 |
| 250 mg./kg. | 20 | 1 | 0 | 0 |

[1] Convulsion of front paws.
[2] Convulsion of front and hind paws.
[3] Died.

The tests show that, at a dose of 100 mg./kg., compound I has a distinct anticonvulsive action; in round numbers the dose of about 100 mg./kg. corresponds to the $ED_{50}$.

CONVULSION DISCHARGE BY I.V. APPLICATION OF PENTYLENETETRAZOL (CARDIAZOL)

The lactone of 2-allyl-2-($\beta$-hydroxypropyl)malonic acid ureide (I) was homogeneously triturated in 0.8% methylcellulose (Tylose) and administered orally with an esophageal probe. One hour later, a 0.5% Cardiazol solution was sprayed at a uniformly slow rate, with control of the time, into the tail veins of the mice, until the first convulsion appeared. The administered quantity of Cardiazol in mg./kg. was calculated from the weight of the mouse and of the administered solution.

RESULTS

Controls.—It required, on the average, an administration of 27.3 mg./kg. of Cardiazol to elicit the first convulsion.

300 mg./kg. p.o.—It required, on the average, 46.2 mg./kg. of Cardiazol to evoke the first convulsion.

100 mg./kg. p.o.—It required, on the average, 35.7 mg./kg. of Cardiazol for the first convulsion.

200 mg./kg. s.c.[1]—It required, on the average, an administration of 33.4 mg./kg. of Cardiazol for the first convulsion.

[1] s.c.=subcutaneous.

INFLUENCE ON OXYGEN DEFICIENCY-EEG AND -EKG

The rats employed in this test were of a type having a high predisposition to audiogenically evoked epileptic convulsions. The animals were placed in a reduced pressure chamber and, while simultaneously carrying out EEG and EKG measurements, were brought up to a simulated altitude of 11,000 meters.

RESULTS

All five test animals, each having been given a single dose of 200 mg./kg. of compound I intraperitoneally 30 minutes prior to the test, showed a high resistance to the effect of altitude in the EEG and EKG.

Upon administration of doses of 100 mg./kg. each for 6 successive days, all five test animals of this group also showed a distinct improvement in altitude stability.

INFLUENCE ON GLUCOSE-TRANSPORT FROM THE BLOOD INTO THE BRAIN

Mice weighing 20 to 30 grams were each injected intraperitoneally with a dose of 200 mg./kg. of compound I. Thirty minutes later the animals, concurrently with a control group of animals, were given intravenous injections of 1.3 μc. $C^{14}$-labeled glucose. After 10 minutes, the animals were sacrificed and each brain subdivided into the following parts: cerebral hemispheres, cerebellum (little brain) and brain stem. After drying and cremating (conversion to ash form) the brain parts, the activity was measured and the $C^{14}$-activity of the brain tissue determined in percent of the blood activity.

RESULT

With a single dose, improvement in glucose utilization was observed in half of the tested animals.

In the chronic test, i.e. with a six times administration of 100 mg./kg./day, a significant difference could be observed in the brain stem and in the little brain, but not in the cerebral hemispheres, i.e. there was a significant improvement in the glucose utilization in the brain stem and in the little brain.

INFLUENCE OF COMPOUND I ON THE RESPIRATION OF BRAIN TISSUE

Male rats were decapitated, and the whole brain removed and homogenized. The respiration of the homogenizate was measured by the Warburg technique. The action of compound I on the brain respiration is dependent upon the physiological condition of the tissue. Under milieu conditions, which give an optimal respiration activity, compound I has no influence on the respiration up to a molar concentration of $2.21 \times 10^{-4}$.

An entirely different action appears when the tissue respiration has been so damaged by hypertonia of the milieu that treatment with 2,4-dinitrophenol is ineffective. In such case case, compound I raises the respiration by about 20 to 36%.

The new compound I of the present invention is useful in cases where a reduced oxygen- and glucose-utilization of the brain cells, plays a role in sickness incidences. Such cases include illnesses such as migraine, post-concussional headache, rehabilitation after attacks, ageing phenomena such as weakness of memory, etc. Compound I is also useful in improving learning and memory capacities in over-tired or fatigued or convalescent children and students.

A feature of the present invention is that it provides a new compound—the 2-ally-2-(β-hydroxypropyl)malonic acid ureide—of the foregoing Formula I for the treatment of illnesses and disorders which are caused by reduced oxygen- and glucose-utilization of the brain cells, and for use as a psychostimulant.

The new compound I is particularly useful for the relief of migraine headaches, for the treatment of fresh *Commotio cerebri* as well as headaches and inability to concentrate associated therewith. Pre-menstrual complaints are relieved, as are mental fatigue and any accompanying reduction in sexual capacity.

In this connection, the indicated results are achieved by administering to the subject suffering from the indicated disorder(s) 3 to 6 tablets per day, each tablet containing about 100 milligrams of compound I. The administration is thus conveniently effected per os; however, administration can also be i.v., i.p. or s.c. in otherwise per se conventional manner. The aforementioned tablets are made up with carriers which are usual in tabletting.

A further aspect of the invention resides in the preparation of compound I, such preparation involving the adding on of sulfuric acid (—$OSO_3H$) to an allylic double bond of diallylbarbituric acid, followed by splitting of the resultant sulfuric acid ester with a base, with simultaneous ring opening and lactone formation.

The reactions proceed according to the following scheme:

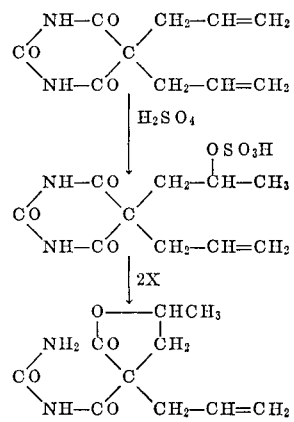

(I)

(X=base, e.g. ammonia, pyridine, etc.).

The yield depends greatly on the solvent medium employed. In general, aliphatic alcohols give good yields, although the yield diminishes with increased chain length. Methanol is thus the solvent of choice. The yields are generally reduced when ketones are used as solvents.

Illustrative embodiments are as follows (percentages being by weight):

EXAMPLE 1

540 grams of diallylbarbituric acid are dissolved in 1020 grams of 92% sulfuric acid and the mixture stirred 10 minutes to allow the ensuing reaction to go to completion. The temperature is not allowed to exceed 28° C. The obtained 5-allyl-5-(β-hydroxysulfopropyl)-barbituric acid solution is then poured into 6 liters of methanol containing 5% of water, ammonia being concomitantly added so that a slight excess thereof is always present. The 5-allyl-5-(β-hydroxysulfopropyl)-barbituric acid solution and the ammonia are added at such rate that the reaction mixture can be kept at a temperature below 30° C. by cooling. Upon completion of the reaction, the mixture is heated to 60° C. and precipitated ammonium sulfate is filtered off. The ammonium sulfate is extracted hot with 3 liters of aqueous methanol and a small amount of ammonia. The methanolic solutions are combined, about 6 liters distilled off, and the concentrated solution cooled. The precipitated crystals (410 grams) are filtered off with suction, washed with a little methanol and dried. The so-obtained lactone of 2-allyl-2-(β-hydroxypropyl)-malonic acid ureide (I) melts at 135–136° C.

A second fraction of compound I is obtained from the mother liquors by evaporation and renewed crystallization, so that the total yield (464 grams)=80% of the theoretical.

EXAMPLE 2

540 grams of diallylbarbituric acid and 1020 grams of 92% sulfuric acid are admixed as in Example 1 and introduced into methanol. At the same time, 1600 grams of pyridine are added. Upon completion of the reaction, the mixture is heated to 60° C., allowed to stand at this temperature for 5 minutes, and the 4 liters of the mixture distilled off. Two liters of water are added to the hot residue, and cooling then effected to induce crystallization. In this way, there is obtained a crude crystallizate (700 grams) from which, by recrystallization from ammoniacal methanol, 420 grams (=70% of the theoretical) of pure lactone of 2-allyl-2-($\beta$-hydroxypropyl)-malonic acid ureide (I) is obtained.

The 2-allyl-2-($\beta$-hydroxypropyl)malonic acid ureide compound was found to be especially suitable for treating human beings suffering from disorders due to insufficient oxygen and glucose utilization in the brain cells. In this connection, various tests were performed on patients suffering from these various disorders under the supervision of Medical Doctors, experts in the field of treating such disorders. The results of these tests are shown below. In these test, the 2-allyl-2-($\beta$-hydroxypropyl)malonic acid ureide compound is refered to a compound I.

CLINICAL TESTS

University Clinic of Neurology, Cantonal Hospital, Zurich (Dr. Isler)

*Compound I as an interval therapy in characteristic migraine*: Generally speaking, we come to the conclusion that Compound I is a really suitable interval therapy for patients with characteristic migraine (ophthalmic migraine, so-called true migraine etc.), and that, because its secondary effects are rare and slight, and its toxicity is low, it represents certain advantages over other more or less equally effective interval medications already on the market.

*Compound I as an interval medication for courses of treatment in common migraine*: Our observations lead us to the conclusion that this is an indication where Compound I is very useful, and that it should certainly be given a large scale trial to prove this. We have already mentioned its additional advantages (low toxicity, not many secondary effects).

*Compound I as an interval medication for courses of treatment in erythroprosopalgia*: With this indication we arrived at surprisingly clear and definite results. Of a total of 9 patients treated in this way the statements of 5 proved with sufficient certainty a very good result. Two of the patients did not report back after the beginning of the treatment; in one of these the diagnosis was not clearly confirmed. It is very striking that the whole middle range in our table (good effect up to moderate deterioration) has remained almost empty. Though we dispensed with measures of objective checking such as double blind tests etc. so far, this obvious result may be taken rather seriously, as even if there is enormous interference through imagination, the probability is negligibly low that such a result could be obtained by way of imagination. We believe that very probably this can be explained by the fact that the medicament acts in a specific way on the processes giving rise to this very clearly defined clinical picture. But, we must add that we treated two cases of erythroprosopalgia, using compound I as a medication for attacks, and in one of the cases it aborted every attack, whereas it was completely unsuccessful in the other patient.

Cantonal Psychiatric Clinic, Wil (Dr. Springer)

The compound I showed a marked activation of the simplest mental processes, i.e. those required in Kraepelin's sum test. In the more differentiated test models the effect was not so uniform. This became evident in the Rorschach form-interpretation test as well as in personal exploration, carried out by the physician in every test person individually, before and after medication. Nonetheless, even in such complicated and demanding tests slight fluctuations towards the positive side were noticeable. The general behavior and the state of reactivity had improved, according to the observations of the nursing staff, particularly in one test person, where no adequate improvement of the test results could be recorded.

Neurological clinic of the Municipality of Vienna, Lainz (Prof. Birkmayer)

We treated 20 patients suffering from cerebral deteriorations of vascular origin with 3 tablets of compound I daily for 4 weeks, each tablet containing 300 mg. of the compound. Before and after this treatment we carried out psychological testing by means of the Hamburg-Wechsler intelligence test, and determined at the same time the flicker fusion threshold. Six patients showed an improvement in performance, 6 a deterioration and 8 no change. It is worth noting that in those patients whose mental performance remained unchanged, the flicker fusion threshold remained unchanged too, whereas the latter rose in the cases with a positive response.

The flicker fusion threshold is a non-specific indication of cerebral performance. There is statistical proof that an improvement in flicker fusion threshold has its correlation in the intelligence test, and this indicates that after administration of compound I, roughly one third of the cases examined showed an objective improvement in performance. In the positive cases the total intelligence quotient rose on the average from 86 to 93, the word capacity showed an average improvement of 5 points, and the capacity of action an average improvement of 11 points. The Rorschach test of the positive cases revealed on the average a 20% increase in the number of answers and in the accuracy of form perception. The flicker fusion threshold showed an average rise of 6 points, but already a rise of 2 points indicates a significant improvement of cerebral capacity.

Results obtained in private practice (Dr. S. Pedroli)

We mainly concentrated on patients suffering from arterial sclerosis or mental fatigue. We treated 25 patients of the first group; two of them died in the meantime, without having experienced an improvement. Of the remaining 23, seven reported a marked improvement in mental performance, as well as better human contacts. Another 8 patients, on the contrary, no distinct change could be noted. It must be stressed that some of these patients are still coming back regularly, to ask for more tablets.

The second group consisted of patients whose complaints were mental fatigue, diminution of intellectual capacity, and lack of concentration. They were mainly younger patients, some of them even pupils between the age of 8 and 14 years.

Of a total of 28 cases 10 have to be regarded as not responding to the treatment. However, it must be stressed that 6 of them were psychiatric cases (depressive cases, paranoids, etc.). Of the 18 patients who responded well, 5 were pupils whose school work improved within a few weeks. Furthermore, there was a lawyer among the cases treated who had had a serious car accident many years ago, and who indicated that he was presently able to deliver a speech of defense for two hours without the slightest strain, which he could not have done before.

Almost without exception overtired employees, secretaries, etc. were able to "keep a clear head" and experienced an improvement in their intellectual performance. Often also an improvement in behavior and human contacts was mentioned. Neither sleepiness nor fatigue, excitation nor sleep disorders were reported.

In conclusion it may be said that compound I brings about an improvement in impaired intellectual activity, whether the impairment is due to arterial sclerosis or simply mental fatigue. However, we believe that no great response can be expected in purely psychiatric disorders, with the likely exception of the psycho-organic syndrome caused by arteriosclerosis.

INVESTIGATIONS ON TOXICITY AND SIDE EFFECTS OF COMPOUND I IN MAN

The compound I was tested for signs of toxicity and side effects on four healthy individuals. Thorough checking of the blood picture did not reveal any toxic effects on the blood. Subjective testing of sleep, sedative effect, disorders of vision, allergic manifestations, effect on appetite, kidneys and intestine did not reveal any secondary reactions at a dosage of 3 times 50 mg. daily for 8 days.

The best dosage depends not so much from the disease to be treated, as from the constitution of the patient. Experience shows that dosages of ca. 1000 mg. daily do not give unwanted side effects on the average patient.

CLINICAL CURE

A typical clinical cure consists in the administration of 3 tablets daily, each tablet containing 300 mg. Such cure lasts 4–6 weeks, after which the healing is complete in most cases.

NOTICE

It should be noted that all of the aforementioned ailments, viz, migraine, mental fatigue, erythroprosopalgia, cerebral deterioration, diminution of intellectual capacity etc. are due to reduced utilization of oxygen and glucose in the brain cells.

What is claimed is:

1. The method of treating migraine, headache, loss of memory due to aging phenomena and of improving learning and memory capacity, which comprises improvement of the oxygen- and glucose-utilization in the brain cells by administering to a subject having the above disorders an effective amount of the lactone of 2-allyl-2-($\beta$-hydroxypropyl)malonic acid ureide.

2. The method of treating migraine or headaches due to insufficient oxygen- and glucose-utilization in the brain cells which comprises administering to a subject suffering from said disorder an effective amount of the lactone of 2-allyl-2-($\beta$-hydroxypropyl)malonic acid ureide.

3. The method of improving the memory capacity which comprises administering to a subject requiring such treatment an effective amount of the lactone of 2-allyl-2-($\beta$-hydroxypropyl)malonic acid ureide.

References Cited

Chem. Abst., 61, 43,106 as abstracted from Postepy Hig. Med. Doswiadozalnej., 15, 394–6 (1960).

Chem. Abst., 62, 16,781f as abstracted from Conf. Hung. Therap. Invest. Pharmacol., 2, Budapest, 1962, 99–103.

Merck Index, 7th ed. (1960), pp. 794–795.

Current Therapy (1966), pp. 581–583 and 566–571.

STANLEY J. FRIEDMAN, Primary Examiner